(12) United States Patent
Schirripa

(10) Patent No.: US 6,636,834 B1
(45) Date of Patent: Oct. 21, 2003

(54) COMPUTER SYSTEM AND METHODS FOR MANAGEMENT, AND CONTROL OF ANNUITIES AND DISTRIBUTION OF ANNUITY PAYMENTS

(75) Inventor: Felix Schirripa, Colts Neck, NJ (US)

(73) Assignee: Metropolitan Life Insurance Company, New York, NY (US)

( * ) Notice: Subject to any disclaimer, the term of this patent is extended or adjusted under 35 U.S.C. 154(b) by 0 days.

(21) Appl. No.: 09/513,430

(22) Filed: Feb. 25, 2000

Related U.S. Application Data

(63) Continuation of application No. 09/140,715, filed on Aug. 26, 1998.

(51) Int. Cl.[7] .............................................. G06F 17/60
(52) U.S. Cl. .................. 705/4; 705/35; 705/36
(58) Field of Search .................. 705/1, 4, 35, 36; 283/54

(56) References Cited

U.S. PATENT DOCUMENTS

| | | | |
|---|---|---|---|
| 4,566,066 A | 1/1986 | Towers | 705/36 |
| 4,642,768 A | 2/1987 | Roberts | 705/4 |
| 4,648,037 A | 3/1987 | Valentino | 705/36 |
| 4,674,044 A | 6/1987 | Kalmus et al. | 705/37 |
| 4,722,055 A | 1/1988 | Roberts | 705/36 |
| 4,750,121 A | 6/1988 | Halley et al. | 705/35 |
| 4,752,877 A | 6/1988 | Roberts et al. | 705/35 |
| 4,774,663 A | 9/1988 | Musmanno et al. | 705/36 |
| 4,839,804 A | 6/1989 | Roberts et al. | 705/36 |
| 4,933,842 A | 6/1990 | Durbin et al. | 705/30 |
| 4,942,616 A | 7/1990 | Linstroth et al. | 704/275 |
| 4,953,085 A | 8/1990 | Atkins | 705/36 |
| 4,969,094 A | 11/1990 | Halley et al. | 705/36 |
| 5,101,353 A | 3/1992 | Lupien et al. | 705/37 |
| 5,126,936 A | 6/1992 | Champion et al. | 705/36 |
| 5,148,365 A | 9/1992 | Dembo | 705/36 |
| 5,193,056 A | 3/1993 | Boes | 705/36 |
| 5,214,579 A | 5/1993 | Wolfberg et al. | 705/36 |
| 5,262,943 A | 11/1993 | Thibado | 600/300 |
| 5,291,398 A | 3/1994 | Hagan | 705/4 |
| 5,414,838 A | 5/1995 | Kolton et al. | 707/104.1 |
| 5,631,828 A | 5/1997 | Hagan | 705/4 |
| 5,644,727 A | 7/1997 | Atkins | 705/40 |
| 5,673,402 A | 9/1997 | Ryan et al. | 705/38 |
| 5,745,706 A | 4/1998 | Wolfberg et al. | 705/35 |

(List continued on next page.)

FOREIGN PATENT DOCUMENTS

| | | | |
|---|---|---|---|
| DE | 3400-123 A | 7/1985 | |
| JP | 53-76724 | 7/1978 | |
| JP | 58-144965 A | 8/1983 | |
| JP | 59-153259 A | 9/1984 | |
| JP | 3-65785 A | 3/1991 | |
| WO | WO 95/06290 | 3/1994 | G06F/17/00 |

OTHER PUBLICATIONS

Kellison S.G., The Theory of Interest, Richard D. Irwin, 1970.*

Anon., "TIAA–CREF Plan Allows Flexible Fund Transfers," (Abstract only) Best's Review: Life/Health, Jul. 1988, p. 94.*

Koco, L., "Product/News Marketing: Annuity Exchange Plan Introduced," (Abstract only), National Underwriter (Life/Health/Financial Services), vol. 4, pp. 29–30, Jan. 22, 1990.*

(List continued on next page.)

*Primary Examiner*—Nicholas David Rosen
(74) *Attorney, Agent, or Firm*—Fulbright & Jaworski LLP

(57) ABSTRACT

A computer system and methods for management and control of annuities and distribution of annuity payments is presented which enables transfer of funds between annuities, whether variable or fixed, without incurring payment discontinuity, while providing for allocation of interest risk, investment risk, and mortality risk between insurer and insured.

5 Claims, 5 Drawing Sheets

U.S. PATENT DOCUMENTS

| | | | |
|---|---|---|---|
| 5,752,236 A | 5/1998 | Sexton et al. .................. | 705/4 |
| 5,754,980 A | 5/1998 | Anderson et al. .............. | 705/4 |
| 5,806,042 A | 9/1998 | Kelly et al. .................... | 705/4 |
| 5,819,230 A | 10/1998 | Christie et al. ................ | 705/4 |
| 5,852,811 A | 12/1998 | Atkins .......................... | 705/36 |
| 5,864,685 A | 1/1999 | Hagan .......................... | 705/35 |
| 5,864,828 A | 1/1999 | Atkins .......................... | 705/36 |
| 5,875,437 A | 2/1999 | Atkins .......................... | 705/40 |
| 5,878,405 A | 3/1999 | Grant et al. ................... | 705/39 |
| 5,884,285 A | 3/1999 | Atkins .......................... | 705/36 |
| 5,893,071 A | 4/1999 | Cooperstein ................... | 705/4 |
| 5,911,135 A | 6/1999 | Atkins .......................... | 705/36 |
| 5,911,136 A | 6/1999 | Atkins .......................... | 705/36 |
| 5,926,792 A | 7/1999 | Koppes et al. ................. | 705/4 |
| 5,991,744 A | 11/1999 | DiCresce ...................... | 705/36 |
| 5,999,917 A | 12/1999 | Facciani et al. ............... | 705/36 |
| 6,332,132 B1 * | 12/2001 | Halpern ........................ | 705/36 |
| 6,336,102 B1 * | 1/2002 | Luskin et al. ................. | 705/35 |

OTHER PUBLICATIONS

Anon. "Charter National Life," (Abstract only), Best's Review (Life/Health) pp. 62 and 65, May 1991.*

Anon., "Exchanging Annuity Contracts Issued by Troubled Companies," (Abstract only), Trusts & Estates, vol. 132, No. 8, p. 56 Aug. 1993.*

Meyer, F.W., "The Variable Annuity," Life & Health Insurance Sales, vol. 136, No. 8, pp. 20–21, Aug. 1993.*

Cruz, H., "Sun–Sentinel, Fort Lauderdale, Florida, Humberto Cruz Column," Sun–Sentinel, May 8, 1996.*

Beam, B.T. et al., "Accounting for Pension Costs," Journal of the American Society of the CLU and ChFC, vol. 51, No. 6, pp. 2 29, Nov. 1997.*

RetireWeb glossary, www.retireweb.com/glossary.html, Apr. 1997.*

AltaVista Web search results, through www.AltaVista.com, Mar. 2000.*

Gazis, D.C., "Real Estate Investment Analysis Systems," *IBM Technical Disclosure Bulletin*, vol. 13, No. 11, Apr. 1971 (pp. 3274–3275).

"Software at His Beck and Call, Manager's Bonds are Beautiful," *Wall Street Computer Review*, Jun. 1985 (pp. 9–12).

"Financial ES plans a complex future," AIWeek, Jun. 15, 1988.

Chapter 7—Optimal Risky Portfolios of book titled "Investment" (pp. 192–233).

HR Magazine, V. 38, N11, Nov. 1993, "Helping Employees Invest Wisely," H K. Ranftle, et al., pp. 77–82.

Anonymous, "GICs in a new guise," Institutional Investor, V28, N1, p. 138 (1/94).

Watson, Ronald D., "Does targeted investing make sense?" Financial Management, V23, N4, pp. 69–74 (Wntr '94).

Mylnechuk, Larry H., "GIC Future Guided by Participant Desire for Stable Asset," Pension World, V28, N5, pp. 21–23 (5/92).

Sellon, Gordon, "Changes in Financial Intermediation: The role of Pension and Mutual Funds," Economic Review, V77, N3, pp. 53–70 (Fall '92).

Rom, B. and Ferguson, K. W., "Post–Modern Portfolio Theory Comes of Age," The Journal of Investing, pp. 11–17 (Fall '94).

Vladimir de Vassal, "Negative Returns Valuable in Risk Assessment," Aug. 18, 1997, Pensonal Investments vol 25 No. 17 p. 30.

Bodie, Kane & Marcus, "Investments, $3^{rd}$ Edition," Irwin, McGraw Hi 11 (1996).

Bowers, et al., "Actuarial Mathematics," $2^{nd}$ Ed. (1997).

* cited by examiner

COMPUTER SYSTEM AND METHODS FOR MANAGEMENT, AND CONTROL OF ANNUITIES AND DISTRIBUTION OF ANNUITY PAYMENTS

This is a continuation of application Ser. No. 09/140,715, filed Aug. 26, 1998.

FIELD OF THE INVENTION

The present invention relates to methods and apparatus for management and control of annuities and distribution of annuity payments.

BRIEF DESCRIPTION OF THE PRIOR ART

Annuities are contracts issued by insurers that provide one or more payments during the life of one or more individuals (annuitants). The payments may be contingent upon one or more annuitants being alive (a life-contingent annuity) or may be non-life-contingent. The payments may be made for a fixed term of years during a relevant life (an m-year temporary life annuity), or for so long as an individual lives (whole life annuity). The payments may commence immediately upon purchase of the annuity product or payments may be deferred. Further, payments may become due at the beginning of payment intervals (annuities-due), or at the end of payment intervals (annuities immediate). Annuities that provide scheduled payments are known as "payout annuities." Those that accumulate deposited funds (e.g, through interest credits or investment returns) are known as "accumulation annuities."

Annuities play a significant role in a variety of contexts, including life insurance, disability insurance, and pensions. For example, life insurances may be purchased by a life annuity of premiums instead of a single premium. Also, the proceeds of a life insurance policy payable upon the death of the insured may be converted through a settlement option into an annuity for the beneficiary. An annuity may be used to provide periodic payments to a disabled worker for so long as the worker is disabled. Retirement plan contributions may be used to purchase immediate or deferred annuities payable during retirement.

A life annuity may be considered as a guarantee that its owner will not outlive his or her payout, which is a guarantee not made by non-annuity products such as mutual funds and certificates of deposit (CDs). (Note that the terms "owner," "annuitant," "annuity purchaser," or "investor" need not refer to the same person. Herein, the terms will be used interchangeably with the meaning being understood by context.) Payout annuities can provide fixed, variable, or a combination of fixed and variable annuity payments. A fixed annuity guarantees certain payments in amounts determined at the time of contract issuance. A variable annuity will provide payments that vary with the investment performance of the assets that underlie the annuity contract. These assets are typically segregated in a separate account of the insurer. A combination annuity pays amounts that are partly fixed and partly variable.

Both fixed and variable annuities can guarantee scheduled payments for life or for a term of years. A fixed annuity offers the security of guaranteed, pre-defined periodic payments. A variable annuity also guarantees periodic payments, but the amount of each payment will vary with investment performance. Favorable investment performance will generate higher payments. This is a major benefit during inflationary periods because the growth in payments may offset the devaluation of money caused by inflation. In contrast, fixed annuities provide fixed payments that become successively less valuable over time in the presence of inflation.

Although investment returns are not guaranteed to the owner of a variable annuity, the owner has the opportunity to achieve investment results that provide ultimately higher payments than provided by the fixed annuity payment. The range of investment options associated with variable annuity contracts is quite broad, ranging from fixed income to equity investments. Typically, the consideration paid for the variable annuity fund will be used to purchase the underlying assets. The annuitant is then credited with the performance of the assets.

At all times, the insurer must maintain adequate financial reserves to make future annuity benefit payments. The reserves of an annuity fund and the benefits payable will be affected by a plurality of factors such as mortality rates, assumed investment return, investment results and administrative costs. Actuarial mortality tables may be used to determine the expected future lifetime of an individual and aggregates of individuals. The future lifetime may be thought of as a random variable that affects the distribution of payments over time for a single annuity or aggregates of annuities. Typically, mortality assumptions will be made at the time of contract issuance based upon actuarial mortality tables. Mortality tables may reflect differences in actuarial data for males and females, and may comprise different data for individual markets and group markets. The insurer bears the risk that the annuitant will live longer than predicted. The annuitant bears the risk of dying sooner than expected. The future performance of the underlying investments may also be estimated by assuming an expected rate of return on the investments. The investment performance will affect the available reserves in any given payment interval and will also affect the present value of a benefit payment to be made in a given payment interval. The present value of a single payment to be made in the future may be thought of as a random variable:

$$y_t = b_t v_t$$

where $y_t$ is the present value of the benefit payment, $b_t$, and $v_t$ is the interest discount factor from the time of payment back to the present time. Thus, $v_t$ is itself a random variable dependent upon market factors.

The present value of an annuity is therefore a random function, Y, of random variables representing interest and the future lifetime of the annuitant. The actuarial present value, $\ddot{a}_x$, of an annuity for a life at age x 10 is the expected value of Y, E[Y]. For example, for a whole-life annuity-due that pays a unit amount at each payment period, k, the actuarial present value of the annuity may be expressed as:

$$\ddot{a}_x = \sum_{k=0}^{\infty} v_k^k {}_k p_x \qquad (1)$$

where: $v^k$ is the interest discount factor for a payment at the kth payment interval and ${}_k p_x$ is the probability that a life at age x survives to age x+k, as determined from actuarial mortality tables. To simplify analysis, it is commonly assumed by actuaries that the effective interest rate, i, is constant, so that the discount factor v is a constant given by $v = (1+i)^{-1}$.

Equation (1) defines a backward recursion relation for determining the actuarial present value of the annuity at any interval k, as follows:

$$\ddot{a}_x = 1 + \sum_{k=0}^{\infty} v_{k+1}^{k+1} p_x \qquad (2)$$

$$= 1 + vp_x \sum_{k=0}^{\infty} v_k^k p_{x+1}$$

$$= 1 + vp_x \ddot{a}_{x+1} \text{ so that}$$

$$\ddot{a}_{x+k} = 1 + vp_{x+k} \ddot{a}_{x+k+1}$$

Similarly, recursion relations can be developed for other types of annuity structures.

The growth of the annuity funds will depend on the payments, $b_k$, made at each interval, the investment returns on the funds, the premiums paid into the fund by the purchaser, and any expenses charged against the fund. Expenses incurred by the insurer will include taxes, licenses, and expenses for selling policies and providing services responsive to customer needs.

A typical annuity contract incorporates fixed assumptions concerning mortality and expenses at the time of contract inception. Positive or adverse deviations from these assumed distributions will be absorbed by the insurer. For a fixed annuity, the insurer bears the risk that the investment return guaranteed to the contract holder will be greater than the actual market performance attainable by investment of the fixed premium or premiums received from the payee.

In contrast, for a variable annuity, the risk that the investment return on assets underlying the annuity will exceed or fall below an investment return rate assumed at the time of contract issuance is passed to the contract holder.

This is done by computing a subsequent payment, $b_{k+1}$, due at time k+1, from a prior payment, $b_k$, at time k according to:

$$b_{k+1} = b_k \frac{1 + r_{k+1}}{1 + i} \qquad (3)$$

where:

$r_{k+1}$ is the actual investment return in the interval from k to k+1; and i is the assumed investment return (AIR).

(See, e.g., "Actuarial Mathematics," 2nd Ed., Bowers, et al., 1997, chapter 17.)

Clearly, if the assumed investment return (AIR) is smaller than the actual return (less expenses), the benefit level of a variable annuity will increase. Conversely, if the actual return (less expenses), falls below the AIR, the benefit level will decrease. Thus, the investment risk is borne by the annuity investor. Since variable annuity investors generally prefer that benefits increase rather than decrease over time, insurers will choose an AIR that is lower than the expected value of the actual investment return. For example, in recent markets the AIR has been in the range of about 4 to 6%.

The net consideration, $\pi_{NET}$, for a paid-up annuity divided by the actuarial present value of the annuity for a life at age x establishes the initial value for the recursion relation of equation (3):

$$b_o = \pi_{NET}/\ddot{a}_x \qquad (4)$$

For a fixed annuity, all payments are equal so that:

$$b_{k+1} = b_k = b_o = \pi_{Net}/\ddot{a}_x \qquad (5)$$

However, the actuarial present value of the variable annuity is typically larger than the actuarial present value of the fixed annuity. This is because the AIR for a variable annuity tends to be lower than the return that may be assumed for a fixed annuity. A lower AIR results in a higher actuarial present value which in turn results in a lower initial benefit. Therefore, for the same net consideration, the initial payment of the variable annuity will be lower than the fixed payment provided by the fixed annuity. However, a lower AIR will result in future payments that increase faster or decline slower than would result from a higher AIR.

In order to achieve the same initial payment for both fixed and variable annuities, given the same net consideration, while ensuring adequate reserves, the actuarial present value of the variable annuity could be decreased by increasing the assumed investment return. But this would decrease the rate of growth of future payments to the annuity investor, thereby detracting from the marketability of the variable annuity. Thus, although present variable annuity systems have the desirable feature that payments will ultimately rise above the fixed level provided by the fixed annuity system, they possess the undesirable feature of lower initial payment levels.

Another disadvantage of presently available annuity systems is the inability to effectuate investor-preferred transfers from fixed to variable systems without incurring an undesirable future payment distribution. Using the paid-up annuity as an example, the net consideration allocable to the variable system at the time of transfer, $k \geq 0$, from a fixed system will depend on the market value of the fixed annuity at time k:

$$\pi_{NET}(k) = \ddot{a}_{x+k}^F b_0^F \qquad (6)$$

where the superscript, F, denotes values for the fixed annuity and $b_0$ is the level fixed annuity payment. Upon transfer, the payment at time k+1 will be:

$$b_{k+1} = \frac{\ddot{a}_{x+k}^F b_0^F}{\ddot{a}_{x+k}^V} \cdot \frac{1 + r_{k+1}}{1 + i} \qquad (7)$$

where the superscript, V, denotes values for the variable annuity.

Assuming once again an investment return for the variable annuity low enough to ensure that payments will increase over time and assuming a higher investment rate for the fixed annuity to ensure a valuation of the fixed annuity that is fair to the investor, then $\ddot{a}_{x+k}^F < \ddot{a}_{x+k}^V$. Therefore, the discontinuity factor $R' = \ddot{a}_{x+k}^F / \ddot{a}_{x+k}^V$ will be less than 1, and the investor's desired payment will be reduced by the factor R', and all subsequent future payments will be reduced. Comparable adverse consequences can easily be demonstrated for a transfer from a variable system to a fixed system.

Therefore, a need exists for a variable annuity system that provides initial payments as high as the fixed payment provided by the fixed annuity, while allowing transfer from a fixed annuity to the variable annuity and vice versa without incurring an undesirable future payment distribution resulting from the transfer.

SUMMARY OF THE INVENTION

Objects of the present invention are therefore to provide systems and methods for management and control of annuities and distribution of annuity payments that allow for transfers from fixed to variable annuities and vice versa without incurring undesirable future payment distributions.

A further object of the present invention is to provide a variable annuity option with an initial payment as high as the payment provided by a fixed annuity for the same net consideration.

The present invention comprises an annuity system that allows transfers to or from a fixed annuity without discontinuity in the payment distribution to the annuitant. The invention also further allows for the initial payment of the variable annuity to be the same as the fixed annuity payments. This is accomplished by setting the initial payment of the variable annuity at the time of transfer or purchase equal to the fixed annuity payment and deriving the subsequent payments based on market interest rates at the time each payment is made. Each subsequent payment is based on a current pricing interest rate rather than a fixed assumed investment rate (AIR). The pricing interest rate may vary at each payment interval and may be tied to an objective market interest rate or indicator such as a treasury rate, a corporate bond rate, or other objective rate.

Compensation for the change in actuarial present value of the annuity as a result of a change in interest rates between payments is provided by an interest adjustment factor in the payment progression function. Thus, the annuitant receives full valuation of the transferor annuity without incurring an unfavorable future payment distribution from the transferee annuity.

A key advantage of the annuity system of the present invention is the enhanced flexibility offered to the contract owner. Permitting transfers out of the fixed fund allows the owner to change an otherwise irrevocable decision associated with fixed annuities. Funds allocated to the fixed fund can easily be transferred to a variable annuity investment fund at market value. To do this, future fixed annuity payments are discounted at current pricing interest rates and the amount of the transfer is transferred to an investment division corresponding to the assets underlying the variable fund.

The present invention may be implemented to provide payments that are part fixed and part variable. The investor may transfer some or all of his or her annuity funds from fixed annuities to variable annuities, from variable annuities to fixed annuities or from variable annuities to variable annuities. Payments from the transferor fund are reduced in proportion to the amount transferred, whereas the payments from the transferee fund are increased in proportion to the amount transferred.

The new method offers several key benefits to the annuity owner. These include: (1) the ability to move funds between fixed and variable annuities; (2) variable payments that start at the same level as fixed annuity contracts; (3) no undesirable payment distribution is incurred upon transfer to other investment choices; and (4) there is potentially less volatility in future payments.

These and additional features and advantages of the present invention will become further apparent and better understood with reference to the following detailed description and attached drawings.

DETAILED DESCRIPTION OF THE PREFERRED EMBODIMENTS

Figure 1:
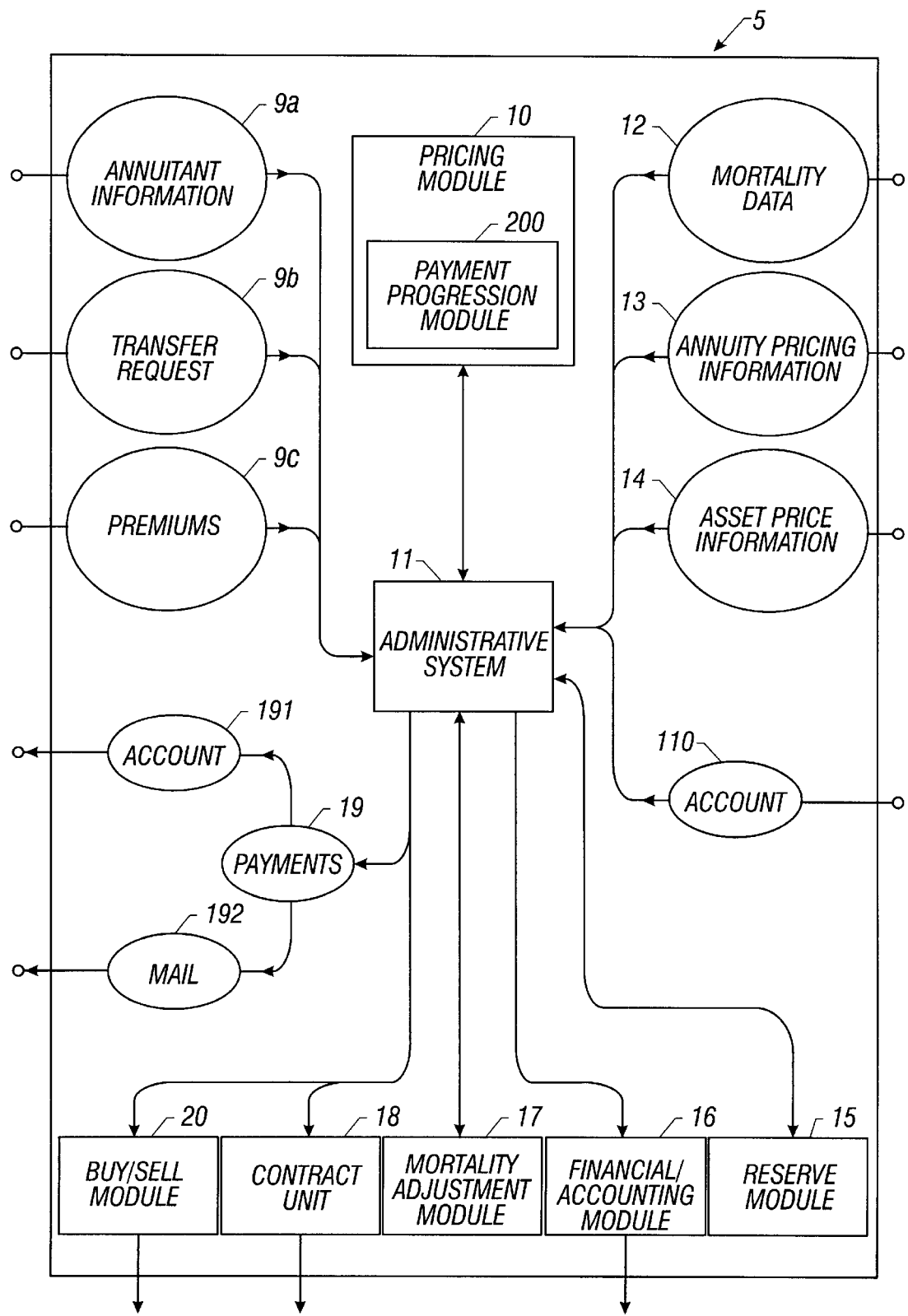
FIG. 1 is a diagram of a preferred embodiment of the present invention.

A diagram of a preferred embodiment of the present invention is shown in FIG. 1 as system 5. The functions of system 5 may be implemented in special purpose hardware or in a general or special purpose computer operating under the directions of software, and in conjunction with memory storage and input/output devices. In a preferred embodiment the functions of system 5 are controlled by software instructions which direct a computer or other data processing apparatus to receive inputs, perform computations, transmit data internally, transmit outputs and effectuate the receipt and transfer of funds as described herein. The present invention provides a system for managing and controlling annuities and distribution of annuity payments, comprising: (1) data storage for storing in accessible memory (a) transfer requests for transferring amounts among said annuities, (b) annuity pricing information for determining pricing interest rates for said annuities, (c) asset price information for determining actual rates of returns for assets underlying said annuities, (d) mortality data for each annuitant of said annuities; and (2) a data processor for (a) deriving pricing interest rates from said annuity pricing information, (b) determining actual rates of returns for said underlying assets of said annuities from said asset price information, (c) computing actuarial present values and fund reserves from said pricing interest rates and said mortality data, (d) computing investment performance factors from said pricing interest rates and said actual rates of return, (e) computing interest adjustment factors from said actuarial present values, and (f) determining payment progressions for said annuities from said investment performance factors and said interest adjustment factors. The system further provides for transferring funds between annuities and transferring payments from said annuities to memory locations representative of separate annuities of payees. Memory storage may be provided by any suitable storage medium that is accessible by the data processor used to implement the invention. Examples include, random access memory, magnetic tape, magnetic disk, or optical storage media.

Referring to FIG. 1, administrative system 11 maintains functional control of system 5 and is preferably implemented as a main program of a software program that comprises various subroutines or modules to perform the functions of the present invention described herein. Various software structures may be implemented by persons of ordinary skill in the art to implement the present invention. The invention is not limited to the embodiments described herein.

Administrative system 11 receives annuitant information 9a from new annuity investors. This information will typically include information about the annuitant that is pertinent to mortality, (e.g., age), the type or types of annuities selected, and the annuity investor's investment choices. For example, the choice may be a combination of a fixed payment annuity and one or more variable payment annuities, with each different annuity supported by different underlying asset classes such as stocks, bonds, etc. Administrative system 11 also receives transfer requests 9b from existing annuity owners. Annuitant information 9a and transfer requests 9b may be input into a memory accessible by administrative system 11, using any suitable input device, preferably a keyboard attached to a video monitor which displays fields for data to be input and which echoes the input data. Alternatively, this information could be received from the annuity investor electronically by way of touch-tone telephone and modem, or by way of the Internet.

Administrative system 11 also receives annuity pricing information 13. Annuity pricing information 13 includes market interest rates used to price annuities. These interest rates may be tied to an objective market rate such as treasury rates, a corporate bond rate or other objective rate. The rates used to price annuities may be related to an objective market interest rate by a constant offset, a multiplicative factor, an exponential function, or any other suitable relationship. Annuity pricing information 13 may be entered into a terminal or received from memory accessible as an electronic database by administrative system 11.

Annuity pricing information 13 and mortality data 12 is passed by administrative system 11 to a pricing module 10. Pricing module 10 may be implemented as a subroutine that functions to cause the computer to determine the market value of annuities based on pricing information 13, and mortality data 12. Mortality data 12 is used to compute actuarial present values of annuities and comprises compiled statistical information, typically in table format, related to the age of the annuitant. Alternatively, mortality data may be computed according to algorithms known in the art. In a preferred embodiment, however, mortality data is stored in memory locations accessible to administrative system 11.

Administrative system 11 also receives asset price information 14 which comprises the net asset values of the underlying assets for each investment subaccount. Asset price information 14 is used by system 5 to determine the investment performance of the assets underlying the annuity funds. Annuity pricing information 13 and asset price information 14 can be implemented as databases that can be updated with new information, either by an external source electronically or by human input using any suitable input device. Annuity pricing information 13, asset price information 14, and mortality data 12, may be accessed by administrative system 11 from a memory location such as a magnetic storage tape or other memory configuration.

Administrative system 11 provides contract information for each new annuitant to contract unit 18. Contract unit 18 provides a written contract for the new annuitant, preferably by way of a commercially available printing device such as a laser printer. A reserve module 15 receives data from administrative system 11 and calculates actuarial reserves. Administrative system 11 also provides data to financial/accounting module 16, which prepares financial and accounting reports. These reports may be displayed on a video monitor, printed on paper, or otherwise recorded in a human-readable medium. Such reports may include the account values of each annuity investor or annuitant, a transaction report for each annuitant, payment information for each annuity, past performance of each annuity, actuarial reserves, etc.

The preferred embodiment also comprises a mortality adjustment module 17. When an annuitant dies the underlying fund value belongs to the insurer and is removed from the portfolio of annuities. In addition, the insurer must credit an annuitant's fund balance for survival that exceeds the insurer's expectation. These functions are performed by mortality adjustment module 17, from data received by administrative module 11, by comparing the present value of future payments to the actual fund balance. This is done on a life-by-life basis within each variable fund. If the present value of future payments is less than the annuitant fund balance, then the insurer must add cash to the investment fund. This may be performed automatically by administrative system 11, which may electronically debit an account 110 of the insurer. Similarly, when an annuitant dies the underlying fund balance may be electronically credited to account 110 of the insurer by administrative system 11. These debits and credits may be reflected in reports generated by financial/accounting module 16.

Administrative system 11 receives transfer request 9b and causes proper fund transfers between sub-accounts for the annuitant. A subaccount, or investment division, is an account for funds invested in assets underlying the annuity. The amount to be transferred and the value of the accounts of each annuitant are stored in a memory storage, and may also be provided in a report generated by financial/accounting module 16.

Administrative system 11 causes proper payments 19 to be made to each annuitant. This may be done by electronic transfer of funds to an annuitant's account 191 or by causing a check payable to the annuitant to be drafted and mailed 192. All payments due and amounts received in premiums 9c will be reported by financial/accounting module 16, either periodically or upon request. Premiums 9c may be received by electronic funds transfer methods well known in the art or by recorded receipt of cash or cash equivalent funds.

A transfer request 9b may be of one of three types: from fixed funds to variable funds, from variable funds to variable funds, or from variable funds to fixed funds. A transfer may be from one or more funds to one or more other funds, as requested by the annuity owner. For example, a 30% transfer from one variable fund could be allocated as follows: 10% to a fixed fund and 10% each to two other variable funds. The invention includes such multiple fund transfers.

System 5 further comprises a payment progression module 200 which determines future payments based upon annuity pricing rates 13, asset price information 14, and mortality data 12. Clearly, payment progression module 200 may be a subroutine called directly by administrative system 11. However, in a preferred embodiment, payment progression module 200 is implemented as a subroutine called directly by pricing module 10. To understand the operation of payment progression module 200, consider a payment $b_n$ from a variable single life annuity due with annual payments at a regularly scheduled payment time, n. It will be assumed that annuity payments are scheduled at equal time intervals, so that the next subsequent payment, $b_{n+1}$, is scheduled at the next subsequent payment time, n+1. The relationship between $b_{n+1}$ and $b_n$ is given by:

$$b_{n+1} = b_n R\left(\frac{\ddot{a}_{x+n+1,i_n}}{\ddot{a}_{x+n+1,i_{n+1}}}\right) \tag{8}$$

where $$R = \left(\frac{1+r_{n+1}}{1+i_n}\right)$$

is the investment performance factor, for the interval between time n and time n+1. The investment return is denoted by $r_{n+1}$, $i_n$ is the pricing interest rate at time n, and $i_{n+1}$, is the pricing interest rate at time n+1. Equation (8) provides the payment, $b_{n+1}$, to be made at time n+1, next subsequent to time n, where n and n+1 are regularly scheduled payment times and where such payments are scheduled at equal time intervals. It will be understood that $r_{n+1}$ is a net investment return after investment management fees, administrative expenses, and mortality and expense risk charges are deducted. It will further be understood that payment progression of equation (8) will apply to other types of variable annuities as well (e.g., joint life, etc.).

The investment performance factor, $R=(1+r_{n+1})/(1+i_n)$ will be greater than 1 if $r_{n+1}>i_n$ and will be less than 1 if $r_{n+1}<i_n$. Thus, the investment performance factor R will increase the subsequent payment if, in the interval from n to n+1, the fund out-performs the pricing interest rate used at the start of that interval. Conversely, R will decrease the subsequent payment if it under-performs the prior pricing interest rate. Thus, to the extent that the fund earns a higher return than the prior pricing interest rate, future payments will rise.

The pricing interest rate, $i_n$, used in the present system, is similar to the benchmark assumed investment rate (AIR) used in the traditional variable annuity. The main difference is that the assumed investment rate used in the prior art is generally a relatively low rate and is held constant for all future payment calculations. For the variable annuity system of the present invention the pricing interest rate is a moving market interest rate based on current market interest rates at each payment determination date.

As a result of using current pricing interest rates instead of an arbitrary assumed investment rate, the initial variable annuity payment at the time of transfer or purchase from a fixed to variable annuity is the same as that under the fixed annuity. However, whereas fixed annuity payments are held constant, the variable annuity has the potential of higher future payments.

The interest adjustment factor, $S=(\ddot{a}_{x+n+1,i_n}/\ddot{a}_{x+n+1,i_{n+1}})$ compensates for the change in actuarial value of the variable annuity caused by the change in pricing interest rates from time n to time n+1. If the numerator of S is viewed as a constant and the denominator is considered a variable that changes with changing pricing interest rates, then the factor reduces to:

$$f(i) = \frac{1}{\ddot{a}_x}$$

and the derivative of this function is:

$$\frac{df(i)}{di} = \frac{v(Ia)_x}{(\ddot{a}_x)^2}$$

where $v=1/(1+i)$ and $(Ia)_x$ denotes an increasing annuity function. The derivative is positive which means that as interest rates rise, the function f(i) increases as well. Thus, the interest related impact of rising rates is an increased payment.

After calculating future annuity payments, payment progression module 200 passes this information back to administrative system 11 which causes proper payments 19 to be credited to the annuitant at the appropriate times. These payments may be distributed periodically, at specified intervals, monthly, quarterly, annually, etc. Payments are recorded in a system memory location and credited to the payee. These amounts are reported by financial/accounting module 16.

A transfer to any annuity may be made at the request of the annuitant at the time of a scheduled payment, at any time between payment periods, or even prior to a first scheduled payment. Thus, a payment calculation date may be the date that the next payment is determined or it may be an interim date for determination of the amount to be transferred as requested. When a transfer occurs between regularly scheduled payment times, it is necessary to derive a pre-transfer payment, $b_k$, at time of transfer, k, based on an investment performance factor, R, that accounts for a time interval between the time, n, of the next preceding regularly scheduled payment, $b_n$, and time of transfer k. Again, in the case of a single life annuity due with annual payments, the investment performance factor, R, is equal to $(1+r_k)/d$, where $$d = \frac{(1+i_n)}{(i+i_k)^{n+1-k}}$$

and the pretransfer payment, $b_k$, is related to the prior payment, $b_n$, as follows:

$$b_k = b_n R\left(\frac{\ddot{a}_{x+n+1,i_n}}{\ddot{a}_{x+n+1,i_k}}\right) \quad (9)$$

Once the pretransfer payment, $b_k$, is determined, an interim payment, $b_I$, must be derived. The interim payment, $b_I$, will generally be equal to the pre-transfer payment, $b_k$, plus an additional amount proportional to the amount to be transferred to the fund. Further, $b_I$, may include an amount based on a contribution to the annuity by the annuity owner at time k. If the amount contributed at time k is P, then $b_I$ is increased by an amount equal to:

$$\frac{P}{v^{n+1-k}(_{n+1-k}p_{x+k})\ddot{a}_{x+n+1,i_k}}$$

where $v^{n+1-k}$ is the interest discount factor at time k for payments commencing at time n+1; and where $_{n+1-k}p_{x+k}{}^*$ is the probability that a life at age x+k survives to age x+n+1. When the transfer occurs between regularly scheduled payments, it is also necessary to compute a post-transfer payment, $b_{n+1}$, to be paid at the next regularly scheduled payment time, n+1, from the interim payment, $b_I$, based on an investment performance factor, R, that accounts for a time interval between the time of transfer, k, and the time, n+1, of the next regularly scheduled payment. In this case, the investment performance factor, R, is equal to $(1+r_{n+1})/d$, where $d=(1+i_k)^{n+1-k}$ and the post-transfer payment, $b_{n+1}$, is related to the interim payment, $b_I$, as follows:

$$b_{n+1} = b_I R\left(\frac{\ddot{a}_{x+n+1,i_k}}{\ddot{a}_{x+n+1,i_{n+1}}}\right) \quad (10)$$

Transfers are a key aspect of the present invention. Since the fixed and all variable funds use the same pricing interest rates, funds can be transferred without incurring any payment discontinuities. In addition, by allowing the pricing interest rates to fluctuate with market movements, transfers into and out of the fixed account do not result in interest rate or disintermediation risk to the insurer. Interest rate risk may arise upon a contract holder's request to transfer funds from the fixed account to a variable account when interest rates have increased. In such a situation the supporting fixed income assets will fall in value resulting in a market value loss when the insurer sells these assets to transfer cash from the fixed fund to the selected variable fund. Using current pricing interest rates to determine the market value of the transferred funds allows the insurer to mitigate this interest rate risk. Disintermediation occurs when customers exercise cash flow options in an effort to select against the insurer. By using current market interest rates to determine resulting payments from transfers into or out of the fixed account, the insurer shifts this and all investment risk to the contract holder.

The transfer process will now be described in further detail with reference to a single life annuity due with annual payments. It will be understood that the process applies for other types of variable annuities as well. It will further be understood that the transfer process will apply to a transfer prior to an initial payment or subsequent to a payment at time n.

Figure 2:
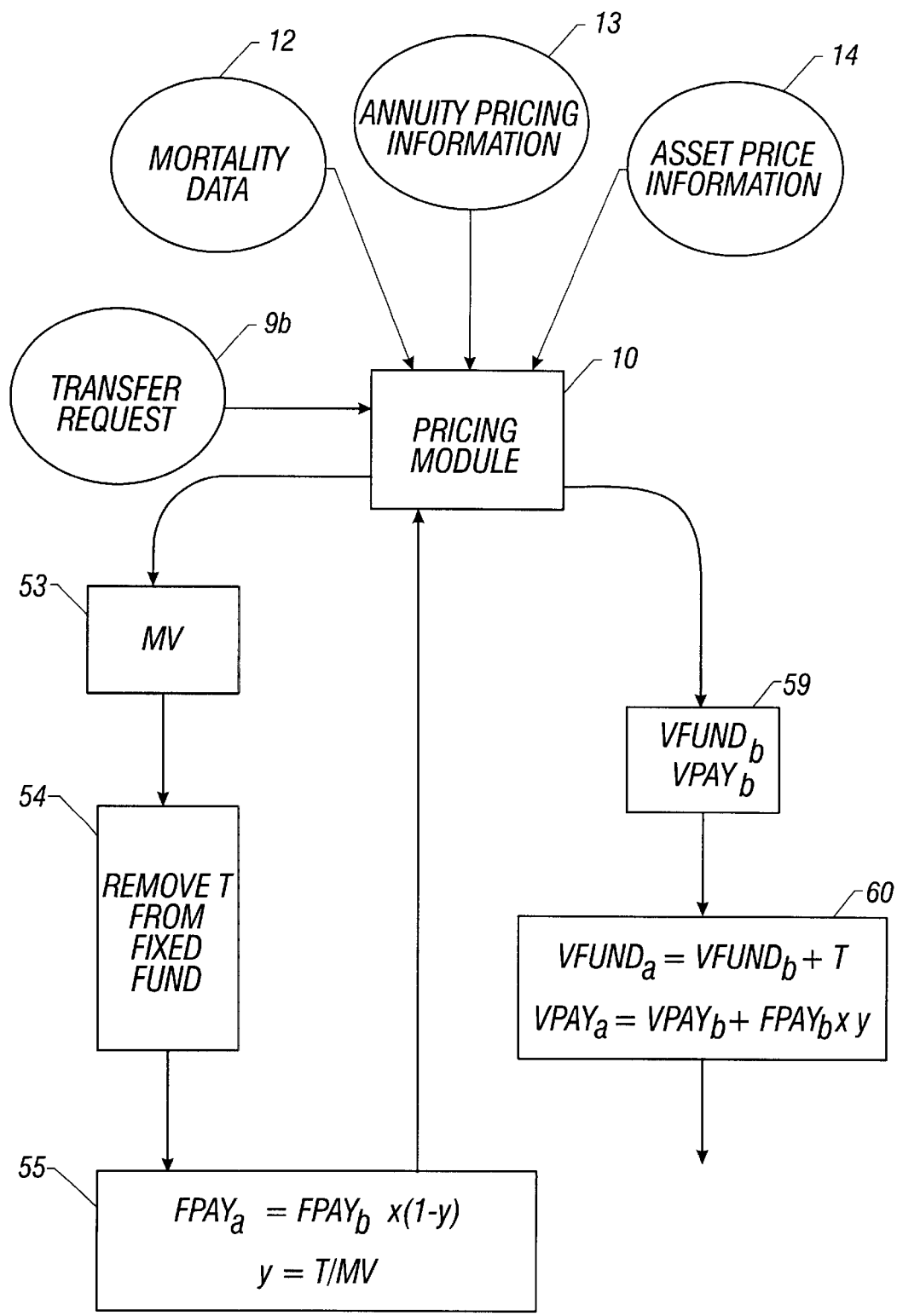
FIG. 2 is a diagram of a transfer from a fixed fund to a variable fund.

A diagram of the fixed-to-variable transfer process is shown in FIG. 2 for a transfer from a fixed fund, F, to a variable fund, V, at time of transfer, k, for a single life annuity due with annual payments. A transfer request 9b is received by administrative system 11. Transfer request 9b will comprise the amount to be transferred, T, or a fraction y of the pre-transfer market value of the fixed fund. The pre-transfer market value, MV, of the fixed fund, F, is computed in pricing module 10 by determining the actuarial present value of future payments using current annuity pricing interest rates 13 and mortality data 12. Once the market value, MV, is determined, 53, the transfer amount T is removed from the fixed fund 54 and the post-transfer fixed fund payment is reduced proportionately, 55. This is shown in FIG. 2 with:

| | |
|---|---|
| FPAY$_b$ | = Fixed Fund Payment Before Transfer |
| FPAY$_a$ | = Fixed Fund Payment After Transfer |
| | = FPAY$_b$ x (1 − y) |
| VPAY$_b$ | = Variable Fund Payment Before Transfer |
| VPAY$_a$ | = Variable Fund Payment After Transfer |
| | = VPAY$_b$ + FPAY$_b$ x (y) |
| FFUND$_b$ | = Fixed Fund Before Transfer |
| FFUND$_a$ | = Fixed Fund After Transfer |
| | = FFUND$_b$ − T |
| VFUND$_b$ | = Variable Fund Before Transfer |
| VFUND$_a$ | = Variable Fund After Transfer = VFUND$_b$ + T |
| y | = T/MV |

For example, if it is determined that the transfer dollar amount is 75% of the pre-transfer fixed fund balance, then the post-transfer fixed payment is 25% (100%−75%) of the pre-transfer fixed payment. The pre-transfer variable fund balance, VFUND$_b$, and pre-transfer variable fund payment, VPAY$_b$, is computed for the selected variable fund, V, 59. This assumes that the annuitant currently has funds in the selected variable fund, otherwise the selected fund will be set up by administrative system 11 as a new annuitant fund and the pre-transfer fund balance and payment is zero. The pre-transfer variable fund payment is calculated in payment progression module 200 as described above, taking into account investment fund performance, via changes in asset prices 14, and interest rate changes from the later of last payment calculation date or transaction date to the transfer effective date. In particular, at the time of transfer, k, the pre-transfer payment at time k, is calculated from the payment, $b_n$, made at payment time n, next preceding time k. Thus, the pre-transfer payment, $b_k$=VPAY$_b$, at time of transfer will be:

$$b_k = b_n \left( \frac{1+r_k}{d} \right) \left( \frac{\ddot{a}_{x+n+1,i_n}}{\ddot{a}_{x+n+1,i_k}} \right) \quad (11)$$

where $d = \frac{(1+i_n)}{(i+i_k)^{n+1-k}}$ and where $r_k$ is the actual rate of return of the assets underlying the variable fund during the time interval from n to k, as derived from asset price information 14 at time n and at time k. The quantity, $i_k$, is the pricing interest rate assumed at time k based on annuity pricing information 13 at time k. The quantity $i_n$ is the pricing interest rate assumed at time n based on annuity pricing information 13 at time n. Note that in a preferred embodiment, the pricing interest rate, $i_k$, in equation (11), used to calculate the pre-transfer payment from the transferee fund, V, at time of transfer, k, is the same rate used to compute the market value of the transferor fund, F. Now, the post-transfer variable fund balance, VFUND$_a$ will then equal the pre-transfer variable fund balance plus the transferred amount T, 60. The post-transfer variable fund payment, VPAY$_a$ will then equal the pre-transfer variable fund payment, $b_k$, plus the proportionate pre-transfer fixed fund payment amount: that is VPAY$_a$=$b_k$+FPAY$_b$×(y), 60. Thus, in the 75% fund transfer described above, the variable fund payment is increased by 75% of the pre-transfer fixed payment. The post transfer variable fund payment, VPAY$_a$, computed at time k, is an interim payment. In a preferred embodiment, this interim payment will not actually be paid out unless the effective date of the transfer coincides with a regularly scheduled variable fund payment, i.e., k=n+1. In an alternative embodiment, the interim payment may be paid out at the time of transfer or at a time between the time of transfer, k, and the next subsequent regular payment date at time n+1. At the time of the next regular payment date, time n+1, subsequent to the time of transfer, k, the payment from the variable fund at time n+1, $b_{n+1}$ will be based upon the post-transfer payment VPAY$_a$ determined at time k and the fund performance in the interval from time k to time n+1:

$$b_{n+1} = VPAY_a(k) \left( \frac{1+r_{n+1}}{d} \right) \left( \frac{\ddot{a}_{x+n+1,i_k}}{\ddot{a}_{x+n+1,i_{n+1}}} \right) \quad (12)$$

where $d=(1+i_k)^{n+1-k}$ and where $r_{n+1}$ is the actual rate of return of the assets underlying the variable fund during the time interval from k to n+1, as derived from asset price information 14 at time k and at time n+1. The quantity, $i_k$, is the pricing interest rate at time k based on annuity pricing information 13 at time k, $i_{n+1}$ is the pricing interest rate at time n+1, based on annuity pricing information 13, at time n+1, and VPAY$_a$(k) is the post transfer payment calculated at time of transfer k.

Figure 3:
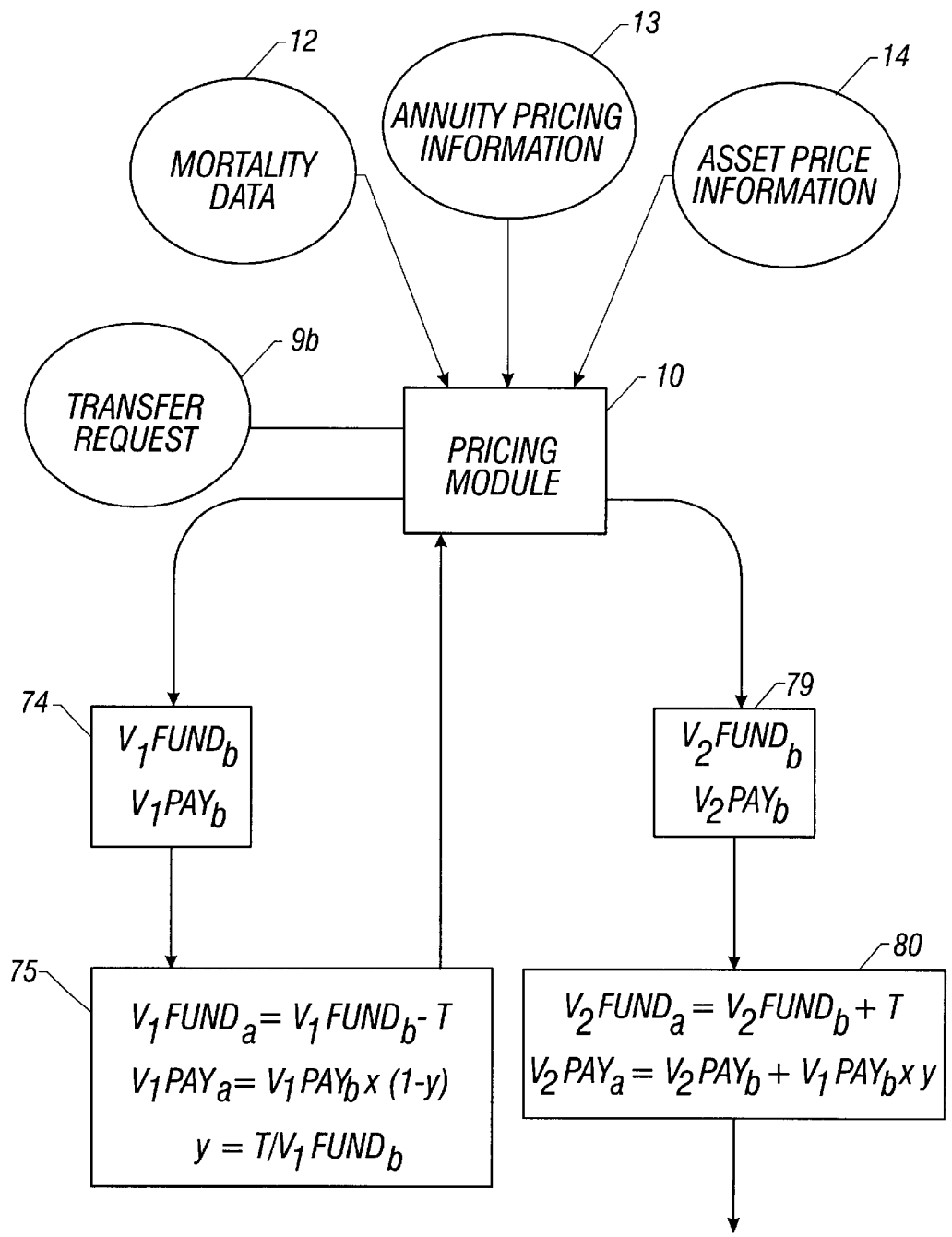
FIG. 3 is a diagram of a transfer from a variable fund to a variable fund.

A variable-to-variable transfer is diagrammed in FIG. 3 for a transfer of an amount T from a first variable fund $V_1$ to a second variable fund $V_2$, at a time of transfer, k. The pre-transfer $V_1$ fund balance, $V_1$FUND$_b$, is computed using annuity pricing information 13 at time k in pricing module 10. The pre-transfer fund payment, $b_k$, at time of transfer, k, for fund $V_1$ is computed by payment progression module 200, as described above, taking into account investment fund performance, via changes in asset prices 14, and changes in interest rates from the later of last payment calculation date or transaction date to the transfer effective date:

$$b_k = b_n \left( \frac{1+r_k}{d} \right) \left( \frac{\ddot{a}_{x+n+1,i_n}}{\ddot{a}_{x+n+1,i_k}} \right) \quad (13)$$

$$\text{where } d = \frac{(1+i_n)}{(i+i_k)^{n+1-k}} \text{ and}$$

where $r_k$ is the actual rate of return of the assets underlying the variable fund $V_1$, during the time interval from n to k, as derived from asset price information 14 at time n and at time k. The quantity, $i_k$, is the pricing interest rate assumed at time k based on annuity pricing information 13, at time k, $i_n$ is the pricing interest rate assumed at time n based on annuity pricing information 13 at time n, and $b_n$ is the $V_1$ fund payment at time n, next preceding transfer time k.

Once the pre-transfer fund balance $V_1FUND_b$ and pre-transfer payment $V_1PAY_b$ for the fund $V_1$, 74, are determined, the amount T to be transferred is subtracted from the fund $V_1$ to determine the post transfer fund balance $V_1FUND_a$ of fund $V_1$. The variable fund $V_1$ payment is reduced proportionately, 75. For example, if it is determined that the amount, T, that is transferred is 75% of the pre-transfer fund balance of fund $V_1$, then the post-transfer payment from fund $V_1$, $V_1PAY_a$, is 25% (100%–75%) of the pre-transfer payment, $b_k = V_1PAY_b$, from fund $V_1$.

A pre-transfer fund balance $V_2PAY_b$ and pre-transfer payment, $b_k = V_2PAY_b$, 79, for the variable fund $V_2$ is determined by payment progression module 200:

$$b_k = b_n \left( \frac{1+r_k}{d} \right) \left( \frac{\ddot{a}_{x+n+1,i_n}}{\ddot{a}_{x+n+1,i_k}} \right) \quad (14)$$

$$\text{where } d = \frac{(1+i_n)}{(i+i_k)^{n+1-k}} \text{ and}$$

where $r_k$ is the actual rate of return of the assets underlying the variable fund $V_2$, during the time interval from n to k, as derived from asset price information 14 at time n and at time k. The quantity, $i_k$, is the pricing interest rate at time k based on annuity pricing information 13, $i_n$ is the pricing interest rate assumed at time n based on annuity pricing information 13 at time n, and $b_n$ is the $V_2$ payment at time n, next preceding transfer time k. This assumes that the annuitant currently has funds in the selected variable fund, $V_2$. Otherwise the selected fund is set up by administrative system 11 as a new annuitant fund and the pre-transfer fund balance and payment is zero. The new fund balance for variable fund $V_2$, will be the pre-transfer fund balance plus the transferred amount T, 80. The post-transfer payment from variable fund $V_2$, $V_2PAY_a$, is derived from the pre-transfer $V_2$ payment $b_k$, plus the proportionate pre-transfer $V_1$ fund balance: $V_2PAY_a = V_2PAY_b + V_1PAY_b \times (y)$, where $y = T/(V_1FUND_b)$. For the 75% transfer example above, the new payment will be increased by 75% of the pre-transfer payment of variable fund $V_1$. This is shown in FIG. 3 with:

| | |
|---|---|
| $V_1PAY_b$ | = Variable Fund $V_1$ Payment Before Transfer |
| $V_1PAY_a$ | = Variable Fund $V_1$ Payment after Transfer |
| | = $V_1PAY_b \times (1-y)$ |
| $V_1FUND_b$ | = Variable Fund $V_1$ Balance Before Transfer |
| $V_1FUND_a$ | = Variable Fund $V_1$ Balance After Transfer |
| | = $V_1FUND_b - T$ |
| $V_2PAY_b$ | = Variable Fund $V_2$ Payment Before Transfer |
| $V_2PAY_a$ | = Variable Fund $V_2$ Payment after Transfer |
| | = $V_2PAY_b + V_1PAY_b \times (y)$ |
| $V_2FUND_b$ | = Variable Fund $V_2$ Balance Before Transfer |
| $V_2FUND_a$ | = Variable Fund $V_2$ Balance After Transfer |
| | = $V_2FUND_b + T$ |
| y | = $T/(V_1FUND_b)$ |

The post transfer $V_1$ variable fund payment, $V_1PAY_a$, computed at time k, is an interim payment. In a preferred embodiment, this interim payment will not actually be paid out unless the effective date of the transfer coincides with a regularly scheduled variable fund payment, i.e., k=n+1. In an alternative embodiment, the interim payment may be paid out at the time of transfer or at a time between the time of transfer, k, and the next subsequent regular payment date at time n+1.

Similarly, the post transfer $V_2$ variable fund payment, $V_2PAY_a$, computed at time k, is an interim payment. In a preferred embodiment, this interim payment will not actually be paid out unless the effective date of the transfer coincides with a regularly scheduled variable fund payment, i.e., k=n+1. In an alternative embodiment, the interim payment may be paid out at the time of transfer or at a time between the time of transfer, k, and the next subsequent regular payment date at time n+1.

Now, at the time of the next regular payment from variable fund $V_1$, time=n+1, the payment from fund $V_1$ at time n+1, $b_{n+1}$, is based on the post-transfer payment for fund $V_1$ calculated at time k, $V_1PAY_a(k)$, and the rate of return from the underlying assets during the time interval from k to n+1:

$$b_{n+1} = V_1PAY_a(k) \left( \frac{1+r_{n+1}}{d} \right) \left( \frac{\ddot{a}_{x+n+1,i_k}}{\ddot{a}_{x+n+1,i_{n+1}}} \right) \quad (15)$$

where $d=(1+i_k)^{n+1-k}$ and where $r_{n+1}$ is the actual rate of return of the assets underlying the variable fund $V_1$ during the time interval from k to n+1, $i_k$ is the pricing interest rate at time k based on annuity pricing information 13 at time k, $i_{n+1}$ is the pricing interest rate at time n+1, based on annuity pricing information 13, at time n+1, and $V_1PAY_a(k)$ is the post transfer payment for $V_1$ calculated at time of transfer k.

Similarly, at the time of the next regular payment from variable fund $V_2$, time=n+1, the payment from fund $V_2$ at time n+1, $b_{n+1}$, is based on the post-transfer payment for fund $V_2$ calculated at time k, $V_2PAY_a(k)$, and the rate of return from the underlying assets during the time interval from k to n+1:

$$b_{n+1} = V_2PAY_a(k) \left( \frac{1+r_{n+1}}{d} \right) \left( \frac{a_{x+n+1,i_k}}{a_{x+n+1,i_{n+1}}} \right) \quad (16)$$

where $d=(1+i_k)^{n+1-k}$ and where $r_{n+1}$ is the actual rate of return of the assets underlying the variable fund $V_2$ during the time interval from k to n+1, $i_k$ is the pricing interest rate at time k based on annuity pricing information 13 at time k, $i_{n+1}$ is the pricing interest rate at time n+1, based on annuity pricing information 13, at time n+1, and $V_2PAY_a(k)$ is the post transfer payment for $V_2$ calculated at time of transfer k.

Figure 4:
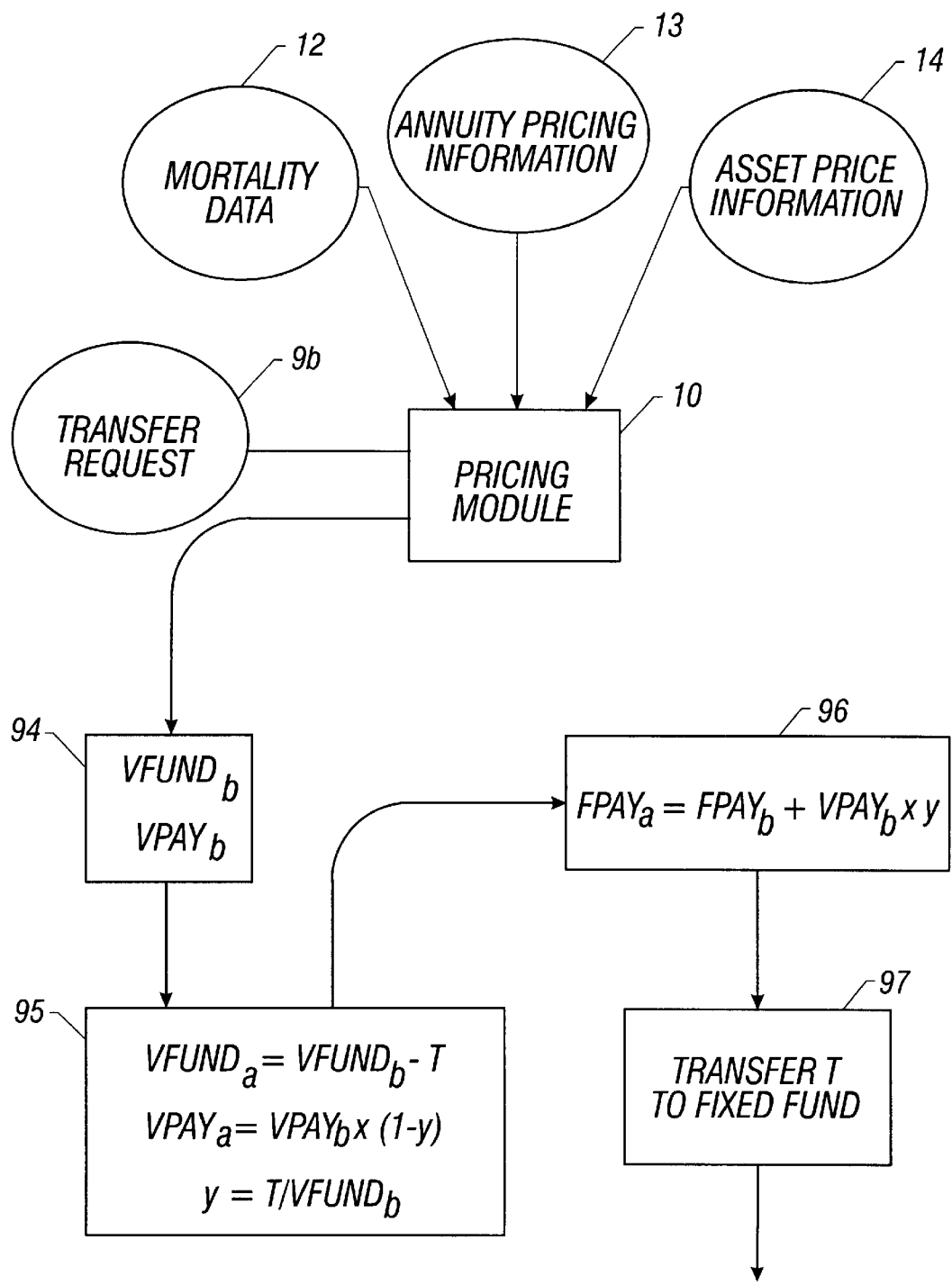
FIG. 4 is a diagram of a transfer from a variable fund to a fixed fund.

The case of a variable-to-fixed fund transfer is diagrammed in FIG. 4, for a transfer from variable fund V to fixed fund F, at time k. The pre-transfer variable fund balance, $VFUND_b$ and pre-transfer variable fund payment, $VPAY_b$, is computed for the time of transfer, k, 94. The pre-transfer payment, $b_k$=$VPAY_b$, of variable fund V is determined by payment progression module 200 as described above, taking into account investment fund performance, via the daily asset prices 14, and interest rate changes from the later of last payment calculation date or transaction date to the transfer effective date:

$$b_k = b_n \left( \frac{1 + r_k}{d} \right) \left( \frac{\ddot{a}_{x+n+1,i_n}}{\ddot{a}_{x+n+1,i_k}} \right) \quad (17)$$

where $d = \frac{(1 + i_n)}{(i + i_k)^{n+1-k}}$ and where $r_k$ is the actual rate of return of the assets underlying the variable fund during the time interval from n to k, $i_n$ is the pricing interest rate at time n based on annuity pricing information 13, and $i_k$ is the pricing interest rate at time k based on annuity pricing information 13. The transfer amount, T, is then removed from the variable fund, V, and the payment is proportionately reduced, 95: $VPAY_a$= Variable Fund Payment After Transfer=$VPAY_b \times (1-y)$, where y=T/$VFUND_b$. If a fixed fund, F, does not exist for the person requesting the transfer, it is set up as a new annuitant fund by administrative system 11. The new fixed fund payment equals the pre-transfer payment plus a proportionate amount of the pre-transfer variable payment 96. For example, if 75% of the variable fund V was transferred to the fixed fund F, then the fixed fund payment would increase by 75% of the pre-transfer variable fund payment. Finally, the transferred amount T is placed in the fixed fund 97. This is shown in FIG. 4 with:

| | |
|---|---|
| $FPAY_b$ | = Fixed Fund Payment Before Transfer |
| $FPAY_a$ | = Fixed Fund Payment After Transfer |
| | = $FPAY_b$ + $VPAY_b$x (y) |
| $VPAY_b$ | = Variable Fund Payment Before Transfer |
| $VPAY_a$ | = Variable Fund Payment After Transfer |
| | = $VPAY_b$x (1 − y) |
| $VFUND_b$ | = Variable Fund Balance Before Transfer |
| $VFUND_a$ | = Variable Fund Balance After Transfer |
| | = $VFUND_b$ − T |
| y | = T/$VFUND_b$ |

The post transfer variable fund payment, $VPAY_a$, computed at time k, is an interim payment. In a preferred embodiment, this interim payment will not actually be paid out unless the effective date of the transfer coincides with a regularly scheduled variable fund payment, i.e., k=n+1. In an alternative embodiment, the interim payment may be paid out at the time of transfer or at a time between the time of transfer, k, and the next subsequent regular payment date at time n+1.

At the next payment date, time n+1, for the variable annuity, the amount to be paid, $b_{n+1}$, is computed based on the events at time of transfer, k:

$$b_{n+1} = VPAY_a(k) \left( \frac{1 + r_{n+1}}{d} \right) \left( \frac{\ddot{a}_{x+n+1,i_k}}{\ddot{a}_{x+n+1,i_{n+1}}} \right) \quad (18)$$

where $d=(1+i_k)^{n+1-k}$ and
where $r_{n+1}$ is the actual rate of return of the assets underlying the variable fund V during the time interval from k to n+1, $i_k$ is the pricing interest rate at time k based on annuity pricing information 13 at time k, i n+1 is the pricing interest rate at time n+1, based on annuity pricing information 13, at time n+1, and $VPAY_a(k)$ is the post transfer payment for V calculated at time of transfer k.

In a preferred embodiment, once the amounts in each fund after transfer are determined, administrative system 11 may cause buy/sell module 20 to execute buy and sell orders as necessary to ensure that the new fund balances are backed by assets of value at the time of transfer equal to the fund balances. Alternatively, if permitted by law, the insurer may exercise investment options while crediting the annuity owner with the investment performance of the underlying assets and market interest rate changes measured from the effective transfer date. For instance, buy/sell orders may be deferred to take advantage of expected changes in asset prices, while contractually the insurer is obligated to the annuitant for the performance of the assets from the effective date of transfer, rather than from the time of buying or selling the underlying assets. The amount to be credited to the annuitant is stored in a system memory and is reported by financial/accounting module 16.

Further, it should be emphasized that each investor may request more than a single transfer from one fund to another. An annuity owner may make multiple transfer requests to be implemented on the same transfer date. For example, an annuity owner may request transfer of an amount $T_1$ from fund 1 to fund 2, an amount $T_2$, from fund 1 to fund 3, an amount $T_3$ from fund 2 to fund 4, etc. These transfer requests would then be implemented by system 5 sequentially on the same date and as rapidly as the limits of computational speed will permit.

Implementing the transfer methods described herein, the annuitant experiences no adverse discontinuity in payment, while bearing the risk of changes in interest rates and changes in the value of the assets underlying the variable funds. In each instance, at the time of transfer, the amount to be transferred may be considered the net consideration used to purchase the annuity to which the transfer is made. When the transferee annuity and the transferor annuity are both valued using the. same current pricing rate and the same mortality assumptions, the payment attributable to the amount transferred will be equal before and after the transfer. In a preferred embodiment the mortality assumptions at the time the annuity owner first purchases an annuity will be used at the time of transfer and payment recalculation dates to compute fund balances and payments. In this case mortality risk is not altered after initial purchase. In an alternative embodiment, the mortality assumptions that prevail at the time of transfer or payment recalculation may be used in the determination of fund balances and payments. Further, in an alternative embodiment, different mortality assumptions could be used in valuation of the transferee annuity and the transferor annuity at the time of transfer. To the extent that the assumptions are different, a discontinuity in payment could occur that could either be favorable or disfavorable to the investor. Such a discontinuity could be offset, in whole or in part, by using differing pricing rates for valuation of the transferee annuity and the transferor annuity. In fact, it will be clear that a discontinuity in payment can be controlled or eliminated by assumption of different pricing rates and different mortality rates for the transferee and transferor annuities. Thus, the present invention offers the flexibility of allocating any proportion of interest rate risk and mortality risk between the insurer and annuitant at the time of transfer, subject to contractual and regulatory constraints.

Figure 5:
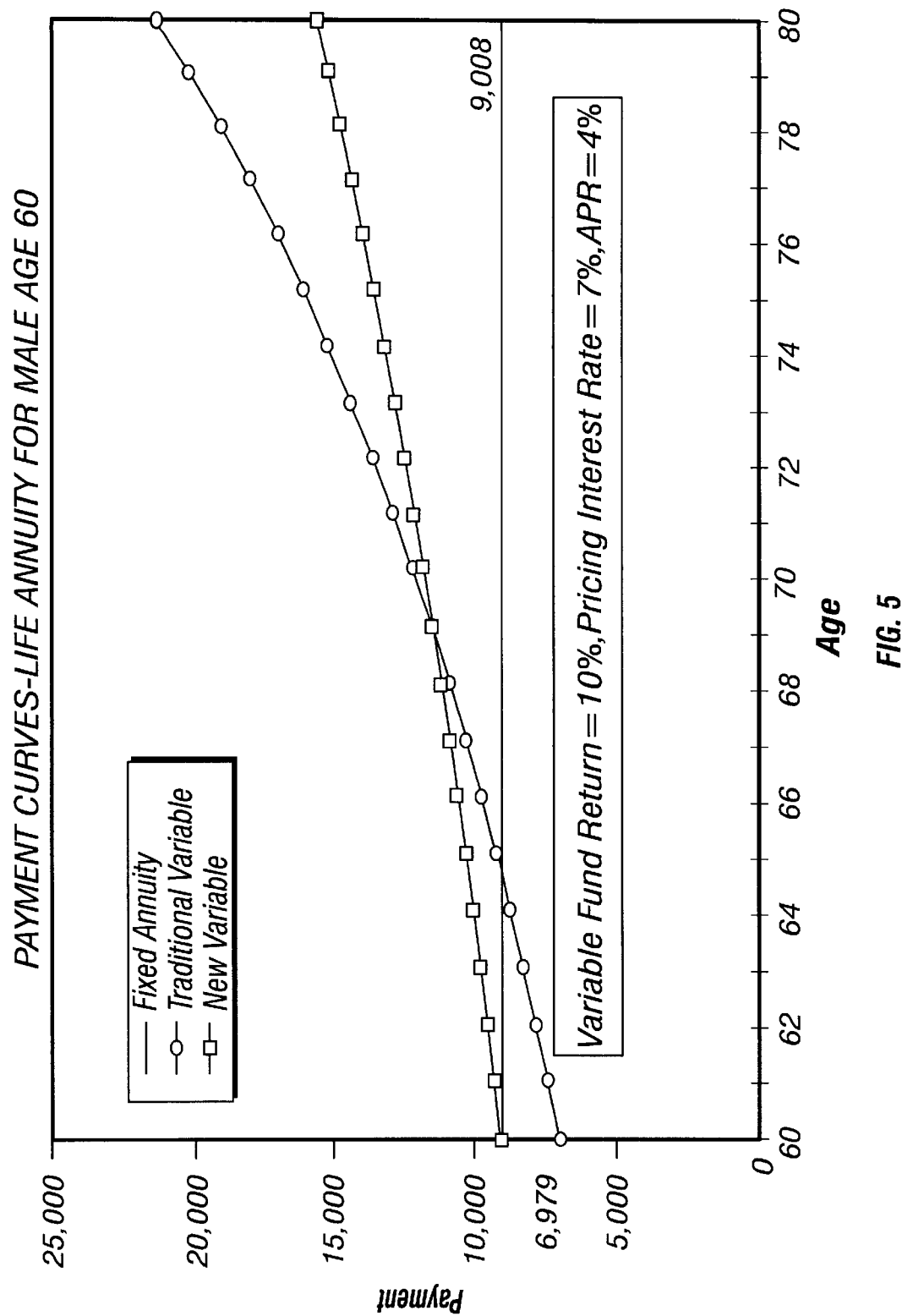
FIG. 5 is an illustration of payment progression functions.

The invention benefits purchasers of payout annuities by providing a more desirable initial payment level than is offered by the prior art form. Furthermore, the invention allows contract holders to transfer funds into and out of the fixed payment option without incurring payment discontinuities. The invention also provides a fair valuation of the contract holder's annuity by using current pricing rates to determine the present value of future payments from the annuity from which funds are transferred. Whereas a traditional variable annuity provides payments that should ultimately rise above the payment of the fixed annuity, the initial variable annuity payment is lower than the fixed fund payment. The present invention provides a new variable annuity that provides an initial payment equal to the fixed fund payment, with subsequent payments that should rise above this level. Results of the present invention in comparison to a fixed fund and traditional annuity are shown in FIG. 5. The AIR of the traditional variable annuity is 4%, which results in an initial payment below the fixed fund payment which is based upon an interest rate of 7%. In contrast, the new variable annuity payment progression starts with an initial payment equal to the fixed fund payment. This is so because both the fixed fund and the new variable fund are priced at the same interest rate of 7%. Assuming a constant rate of investment performance of 10% for both variable funds, the traditional variable fund payments will ultimately exceed the new variable fund payments. This is because the investment performance factor for computing the traditional variable fund payment progression exceeds the investment performance factor for computing the new variable fund payment progression.

While this invention has been described with reference to the foregoing preferred embodiments, the scope of the present invention is not limited by the foregoing written description. Rather, the scope of the present invention is defined by the following claims and equivalents thereof.

What is claimed is:

1. A method for managing and controlling annuities and distribution of annuity payments, comprising:

receiving:
    transfer requests for transferring amounts among said annuities;
    annuity pricing information for determining pricing interest rates for said annuities;
    asset price information for determining actual rates of return for assets underlying said annuities; and
    mortality data for each annuitant of said annuities;
deriving pricing interest rates from said annuity pricing information;
determining actual rates of return for said underlying assets of said annuities from said asset price information;
computing actuarial present values from said pricing interest rates and said mortality data;
computing investment performance factors from said pricing interest rates and said actual rates of return;
computing interest adjustment factors from said actuarial present values; and
determining payment progressions for said annuities from said investment performance factors and said interest adjustment factors;
wherein at least one of said computing or determining steps is performed by software running on a data processing apparatus.

2. The method of claim 1, further comprising the steps of:

transferring funds between said annuities; and
transferring payments from said annuities to memory locations representative of separate accounts of payees.

3. The method of claim 2, wherein said transferring of funds between annuities further comprises buying and selling assets underlying said annuities.

4. A system for managing and controlling annuities and distribution of annuity payments, comprising:

data storage for storing in accessible memory:
    transfer requests for transferring amounts among said annuities;
    annuity pricing information for determining pricing interest rates for said annuities;
    asset price information for determining actual rates of return for assets underlying said annuities; and
    mortality data for each annuitant of said annuities; and
a data processor for:
    deriving pricing interest rates from said annuity pricing information;
    determining actual rates of return for said underlying assets of said annuities from said asset price information;
    computing actuarial present values from said pricing interest rates and said mortality data;
    computing investment performance factors from said pricing interest rates and said actual rates of returns;
    computing interest adjustment factors from said actuarial present values;
    determining payment progressions for said annuities from said investment performance factors and said interest adjustment factors;
    transferring funds between said annuities; and
    transferring payments from said annuities to memory locations representative of separate accounts of payees.

5. The system of claim 4, wherein said transferring of funds between annuities further comprises buying and selling assets underlying said annuities.

* * * * *